Patented Oct. 19, 1937

2,096,045

UNITED STATES PATENT OFFICE 2,096,045

METHOD OF PRODUCING PRESSURE EQUALIZING MATERIAL FOR CABLE CONDUCTORS

Archie R. Kemp, Westwood, N. J., assignor to Bell Telephone Laboratories, Incorporated, New York, N. Y., a corporation of New York No Drawing. Application January 5, 1934, Serial No. 705,401

1 Claim. (Cl. 106—13)

This invention relates to methods of producing partially depolymerized rubber for use as a pressure equalizer or filling material for continuously loaded or unloaded cable conductors. Such rubber is sometimes referred to as liquid rubber.

In the past such depolymerized rubber has been prepared by first thoroughly washing and drying first quality plantation crepe rubber and then breaking it down on a rubber mill by milling for thirty minutes on cool rolls. Following this the rubber is put through a heat treating process in a masticator calling for frequent temperature changes with a close regulation of temperature, followed by straining and treatment in a vacuum. The required regulation of the temperature has been difficult to accomplish and the product has not always been uniform.

Among the objects of the present invention are to produce a process of preparing depolymerized rubber which is easier to manipulate than processes heretofore used, over which more accurate and better control may be exercised, in which decomposition of the rubber and losses due to reduction of rubber decomposition products are reduced, and in which oxidation of the rubber during manufacture is completely or wholly eliminated.

Further objects include production of depolymerized rubber with the lowest dielectric constant, for example, not over 2.55 at 3.3° C. and 2000 cycles, in which $$\frac{G}{C}$$

(ratio of specific conductance to specific capacitance) at 3.3° C. and 2000 cycles is not over 120 and in which the physical properties are satisfactory both at room temperature and at 3.3° C. The required physical properties include among others that the material be a viscous liquid at 3.3° C. and also be stable and viscous at temperatures up to about 25° C.

A process fulfilling the above objects may be outlined as follows:

1. First quality plantation crepe rubber is washed in a continuous stream of clean water for one hour in a rubber washing machine.

2. The washed rubber is dried under vacuum or on heated rubber rolls at about 100° C.

3. The dried rubber is put into an autoclave with about four parts of a suitable solvent, the temperature raised to from 255 to 260° C. and continuously maintained within this range for a period of about five hours. The nature and characteristics of this solvent constitute an essential feature of the invention. A particular solvent suitable for the purpose is tetralin (tetrahydronaphthalene).

4. After cooling the rubber solution is filtered to remove any foreign matter which may be contained therein.

5. The tetralin or other solvent is distilled from the liquefied rubber under vacuum or at as low a pressure as may be conveniently produced. To facilitate this process carbon dioxide is passed through the solution during the distilling operation.

Tetralin is an example of a suitable solvent, the required characteristics of which are that it should be of fairly high boiling point, to be a good solvent for rubber, have a high flash point, a low freezing point, be stable at the boiling point and at 255° C. under pressure, be preferably non-poisonous, non-explosive and non-inflammable, and not have a vapor pressure which is too high at 255° C. Tetralin has these requirements in that it boils at 206° C., has a specific gravity of 0.975, has a flash point of 80° C., and solidifies at minus 95° C. It also has the other desirable properties enumerated.

Another suitable solvent is decalin (decahydronaphthalene) which has a boiling point of 188° C., a flash point of 57° C., a specific gravity of 0.895, suitable dissolving powers for rubber and other desirable properties of the nature specified.

A number of other similar solvents will occur to chemists skilled in the art.

It will be noted that opportunity for oxidation of the product during treatment is relatively limited. Furthermore, the product has electrical and physical properties previously enumerated as desirable. The process may be accurately and easily controlled and a uniform product produced as a result thereof.

What is claimed is:

The method which comprises dissolving one part of washed sulphur free crude rubber in more than one part of a solvent comprising a substance selected from the group consisting of tetrahydronaphthalene and decahydronaphthylene, heating the solution in a closed chamber to about 255° C. for a period of a few hours under non-oxydizing and other conditions to produce as a final product a partially depolymerized derivative of rubber which is viscous at 3.3° C., chemically stable and viscous at 25° C. and having a dielectric constant below 2.55 at 3.3° C. and 2000 cycles per second, and removing the solvent to obtain the said product.

ARCHIE R. KEMP.